(12) United States Patent
Aubert et al.

(10) Patent No.: US 9,829,375 B2
(45) Date of Patent: Nov. 28, 2017

(54) LIGHT SENSING SYSTEM, AND METHOD FOR CALIBRATING A LIGHT SENSING DEVICE

(71) Applicant: KONINKLIJKE PHILIPS N.V., Eindhoven (NL)

(72) Inventors: Xavier Louis Marie Antoine Aubert, Erkelenz (DE); Mauro Barbieri, Eindhoven (NL); Henning Maass, Waalre (NL); Guido Josef Müsch, Erkelenz (DE); Folke Charlotte Noertemann, Raeren (BE); Elsa Inger Stapel Most, Eindhoven (NL); Leo Jan Velthoven, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 64 days.

(21) Appl. No.: 14/648,924

(22) PCT Filed: Nov. 25, 2013

(86) PCT No.: PCT/IB2013/060372
§ 371 (c)(1),
(2) Date: Jun. 2, 2015

(87) PCT Pub. No.: WO2014/102629
PCT Pub. Date: Jul. 3, 2014

(65) Prior Publication Data
US 2015/0338271 A1   Nov. 26, 2015

Related U.S. Application Data

(60) Provisional application No. 61/745,849, filed on Dec. 26, 2012.

(51) Int. Cl.
*G01J 1/08* (2006.01)
*G01J 1/42* (2006.01)

(52) U.S. Cl.
CPC ............... *G01J 1/08* (2013.01); *G01J 1/4204* (2013.01); *G01J 2001/083* (2013.01)

(58) Field of Classification Search
CPC ....... G01J 1/08; G01J 1/4204; G01J 2001/083
See application file for complete search history.

(56) References Cited

U.S. PATENT DOCUMENTS 7,339,665 B2    3/2008  Imura
8,852,127 B2 *  10/2014 Bell .......................... A61B 5/11
                                                340/573.1

(Continued)

FOREIGN PATENT DOCUMENTS

JP    2271222 A    11/1990
JP    H07103825 A   4/1995

(Continued)

OTHER PUBLICATIONS

Kronauer et al, "Quantifying Human Circadian Pacemaker Response to Brief, Extended, and Repeated Light Stimuli Over the Phototopic Range", Journal of Biological Rhythms, vol. 14, No. 6, Dec. 1999, p. 501-515.

(Continued)

*Primary Examiner* — Tony Ko
(74) *Attorney, Agent, or Firm* — Michael W. Haas

(57) ABSTRACT

The present invention relates to a light sensing system for sensing ambient light intensity, comprising a light sensing device with at least one light sensor and a calibration device for calibrating the sensor. The calibration device comprises at least one light source that emits light with a standard intensity. The invention is further related to a corresponding method for calibrating a light sensing device, comprising the illumination of the light sensor of the light sensing device with light that has a standard intensity, the comparison of the output intensity signal of the sensor with an expected signal that corresponds to the standard intensity, and the matching (Continued)

of the output intensity signal of the sensor to the expected signal by adjusting a gain parameter of the sensor.

17 Claims, 2 Drawing Sheets

(56) References Cited

U.S. PATENT DOCUMENTS

| | | |
|---|---|---|
| 2006/0224047 A1 | 10/2006 | Suzuki |
| 2006/0237636 A1* | 10/2006 | Lyons ............... F21K 9/00 250/228 |
| 2007/0035740 A1 | 2/2007 | Nisper |
| 2008/0319354 A1 | 12/2008 | Bell et al. |
| 2009/0051910 A1 | 2/2009 | Imura |
| 2010/0163717 A1 | 7/2010 | Chang et al. |
| 2010/0164479 A1 | 7/2010 | Alameh et al. |

FOREIGN PATENT DOCUMENTS

| | | |
|---|---|---|
| JP | 2006177785 A | 7/2006 |
| JP | 2006271897 A | 10/2006 |
| JP | 2012528302 A | 11/2012 |
| WO | 2008154261 A1 | 12/2008 |
| WO | WO2010136140 A1 | 12/2010 |
| WO | 2011089539 A1 | 7/2011 |
| WO | 2012073183 A1 | 6/2012 |
| WO | 2012095712 A1 | 7/2012 |

OTHER PUBLICATIONS

Hilaire et al, "Addition of a Non-Pphotic Component to a Light-Based Mathematical Model of the Human Circadian Pacemaker", Journal of Theoretical Biology, vol. 247, 2007, pp. 583-599.

Lockley et al, "High Sensitivity of the Human Circadian Melatonin Rhythm to Resetting by Short Wavelength Light", Journal of Clinical Endocrinology & Metabolism vol. 88, No. 9, 2003, pp. 4502-4505.

Czeisler et al, "Bright Light Induction of Strong (Type-0) Resetting of the Human Circadian Pacemaker", Science, vol. 244, 1989, pp. 1328-1333.

Terman et al, "Light Therapy for Seasonal and Non-Seasonal Depression: Efficacy, Protocol, Safety and Side Effects", CNS Spectrums, vol. 10, Issue 8, 2014, pp. 647-663.

Actiwatch Brochure, Downloaded From http://actiwatch.respironics.com/ on Sep. 7, 2016, 4 pages.

\* cited by examiner

LIGHT SENSING SYSTEM, AND METHOD FOR CALIBRATING A LIGHT SENSING DEVICE

CROSS-REFERENCE TO PRIOR APPLICATIONS

This application is the U.S. National Phase application under 35 U.S.C. §371 of International Application Serial No. PCT/IB2013/060372, filed on Nov. 25, 2013, which claims the benefit of U.S. Application Ser. No. 61/745,849, filed on Dec. 26, 2012. These applications are hereby incorporated by reference herein.

FIELD OF THE INVENTION

The invention relates to the field of light sensing systems for sensing ambient light intensity, as well as to a corresponding method for calibrating a light sensing device.

BACKGROUND OF THE INVENTION

Exposure to light is the key mechanism that enables a proper synchronization of the body clock with the solar day cycle. Timing, duration, intensity and spectral composition of light exposure all have impact on the so-called entrainment of a person to a 24-hour circadian rhythm. It has been shown that restorative sleep can only occur in synchronicity with the body clock. For certain people who have a phase shift of their internal body clock relative to the social schedules around them, exposure to bright light at well-defined times can be used to shift their body clock forward or backwards to better align it with their social needs. Also for the treatment of seasonal affective disorder, timed and regular exposure to bright light is an effective means.

The assessment of light levels to which a person is exposed over the course of multiple days or even weeks is an important instrument for the diagnosis of mood and sleep disorders. Existing actigraphy products measure the activity and light exposure with a body-worn device, for example, a wrist-worn device that is used and worn similar to a wristwatch.

Such a wrist-worn device is shown, for example, in US 2008/0319354 A1, showing a system and method for monitoring information related to sleep. The wrist-worn device shown in this document comprises an illumination sensor to provide an information related to the intensity of ambient illumination of the user. The signal of the sensor can be further processed by suitable electronic computing means.

One of the problems to be solved with the present light sensing devices is the accurate measuring of the light the subject is exposed to in his daily life. The challenge is to achieve an acceptable level of accuracy given the profusion of different light sources (natural light, artificial light, light emitting devices (LED), halogen, neon etc.) with distinct spectrum contributions and intensities varying over several orders of magnitudes. This is difficult to be obtained for all conditions, and the common devices are typically pre-calibrated for a specific range of illuminations.

In general, devices including light sensors are calibrated by the manufacturer before being sold. Moreover, the original calibration may have been done inaccurately or may have been realized for different conditions, not corresponding to the intended use of the costumer (in situations with different light intensities or sources). As mentioned above, a wide range of light sources is met in daily life with very distinct spectra and intensities, and achieving a uniform accuracy level under these conditions has been turned out to be almost impossible. In addition, the light sensor characteristics may be altered over time due to temperature differences, or inadequate power supply, for example, when the battery integrated into the device gives a lower voltage. All these factors contribute to the general observation that, when deployed in the field, the light measurements are often of poor accuracy.

SUMMARY OF THE INVENTION

It is therefore an object of the present invention to provide a light sensing system including a light sensing device with an enhanced long-term precision and reliability of light measurements, even under illumination by light sources with very different spectral distributions and intensities.

This object is achieved by a light sensing system comprising the features of claim 1, as well as by a method for calibrating a light sensing device according to claim 10.

The light sensing system according to the present invention comprises not only a light sensing device with at least one light sensor, but also a calibration device for calibrating this sensor. This calibration device comprises at least one light source emitting light with a standard intensity, which is used to match an output intensity signal of the light sensor, for example, by adapting a gain parameter of it. Depending on the specific device, there is the possibility to use only one light sensor and one single light source, or several sensors and/or light sources corresponding to different spectral ranges, like the red, green and blue spectral range. The activation level of the light sources may be controlled, and the output intensity signals of the light sensors can be compared with expected values. Thus a calibration operation can be performed by the user, providing reliable light measurements by the light sensors.

The calibration process can either deal with the white light illuminance level, which in this case would not require coloured light input, or could specifically address the calibration of different colour sensing elements, i.e. light sensors for different spectral ranges. In this case, multiple monochromatic light sources might be used. The user might also be given the option of specifying the typical range of illuminance that he is targeting so that the calibration process could focus on the specific light intensity interval. Specific light sources like halogen or incandescent lamps could be emulated by using a special activation profile of several light sources including colour elements.

According to a preferred embodiment of the present invention, the light sensing system comprises control means for controlling the operation of the light source, for comparing an output intensity signal of the light sensor corresponding to a measured light intensity with an expected signal corresponding to the standard intensity, and for matching the output intensity signal to the expected signal. This matching can be performed, for example, by adjusting a gain parameter of the output intensity signal, like mentioned above. The term "standard intensity" shall designate an intensity that is known with respect to the type of light source, also taking into account operation characteristics like, for example, the temperature, etc. On this basis the expected signal can be taken as a calibration standard. The intensity emitted by the light source can also be controlled accordingly to adapt it to the situation under which the light sensing system is used.

Preferably the control means is comprised within the calibration device and comprises communication means for communicating between the calibration device and the light sensing device. The communication means can provide a wireless or contact-based communication, as desired. The control means can be incorporated into a suitable electronic circuit and performing the control, for example, by means of a suitable computer program stored in it for operation, and also comprising a memory for storing calibration values, gain values, etc.

More preferably, the calibration device is a docking station for supporting the light sensing device. In such a docking station, the light sensing device can be stored so that it can undergo a celebration process when not used. Within the docking station, the light sources can be arranged such that they face the corresponding light sensors, when the light sensing device is placed on or within it.

More preferably, the light sensing device according to the present invention comprises a plurality of light sensors for sensing light with different spectral ranges.

According to another preferred embodiment, the calibration device comprises one light source emitting light within a spectral range covering all spectral ranges of the different light sensors. For example, the light sensors are LED's within the red, green and blue spectral area, while the light source is white-light illuminance source.

According to another preferred embodiment of the present invention, the calibration device comprises a plurality of light sources emitting light within different spectral ranges corresponding to the spectral ranges of light sensors. For example, the light sources are also in the red, green and blue spectral range, corresponding to the respective light sensors so that each light source of a spectral range corresponds to one light sensor in this respect.

Preferably the spectral ranges of the light sources are adjustable, for example, user controllable.

According to another preferred embodiment, the light sensing system according to the present invention comprises a temperature sensor for sensing the temperature of the light sources. To ensure the highest accuracy of the calibration process, the local temperature of the light source is taken into account since the light level of light sources as LED's is known to depend inversely on the temperature of the semiconducting elements.

The present invention is further related to a method for calibrating a light sensing device with at least one light sensor providing an output intensity signal corresponding to a measured light intensity, comprising the steps of illuminating the light sensor with light with a standard intensity, comparing the output intensity signal with an expected signal corresponding to the standard intensity, and matching the output intensity signal to the expected signal by adjusting a gain parameter of the light sensor.

In this case the expected signal is taken as calibration signal to which the output intensity signal is adjusted. The gain parameter of the light sensor may be a multiplication factor to which an original output signal of the sensor is multiplied to match the expected signal. In the simplest case, there is one light source provided with a white light intensity exposition over a white spectral range, to which one single light sensor is adapted to match the target white light intensity exposition by adjusting the gain parameter of this single light sensor. Depending on the type of calibration being carried out and the light sensing device characteristics, different other cases can be considered.

According to one preferred embodiment of the above method, light sensors of different spectral ranges are illuminated with light of one single light source with a predetermined standard intensity, and the gain parameters of the light sensors are adjusted to match their contribution to the output intensity signal. The overall intensity can be taken as the sum of the contributions of the different light sensors, based on the known energy level emitted in each respective colour band. For example, the illumination can be expressed as $$\text{ILLUM(lx)}=6.83*(\alpha*\text{red\_irradiance}+\beta*\text{green\_irradiance}+\chi*\text{blue\_irradiance}) \quad (1)$$

where red_irradiance, green_irradiance and blue_irradiance are the original intensity signals of the sensors in their respective colour bands, and $\alpha$, $\beta$, $\chi$ are the gain parameters of each colour channel, respectively. These gain parameters $\alpha$, $\beta$, $\chi$ of the light sensors are adapted such that the value ILLUM(lx) as overall output intensity signal matches the expected signal.

According to another preferred embodiment of this method, light sensors of different spectral ranges are illuminated with light of different light sources, each having a spectral range corresponding to the spectral range of one light sensor and having a predetermined standard intensity, the output intensity signal of each light sensor is compared with an expected signal corresponding to the standard intensity of its corresponding light source, and the gain parameter of each light sensor is adjusted to match the output intensity signal of this light sensor to the expected signal.

In this case there is not one common light source having a white spectral range covering those of all light sensors, but there is a plurality of light sources, each light source being allocated to one light sensor with regard to its spectral range. This offers the possibility to provide a standard intensity signal for calibrating each light sensor separately, instead of matching gain parameters to achieve a general output intensity signal. In this case the light energy emitted in each respective colour band (i.e., red, green and blue) for each sensor is matched, and the new gain values can be stored in the memory of the system.

Preferably the method according to the present invention comprises the step of adjusting the spectral range or ranges of the light sources. This offers the option to customize the light sensing system to its use in field, for example, to different spectral bands.

More preferably, this method comprises the step of sensing the temperature of the light sources and adjusting the gain parameters according to the sensed temperature. This takes into account that the intensity might depend on the temperature, like it is known for semiconductor light emitting devices (LED's).

The invention is also directed to a computer program provided for carrying out the method according to one of the above embodiments of the invention. This computer program can be stored by the manufacturer within a memory of a light sensing system, as explained above, to carry out the calibration procedure. A suitable storing medium can be provided to store such a computer program.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
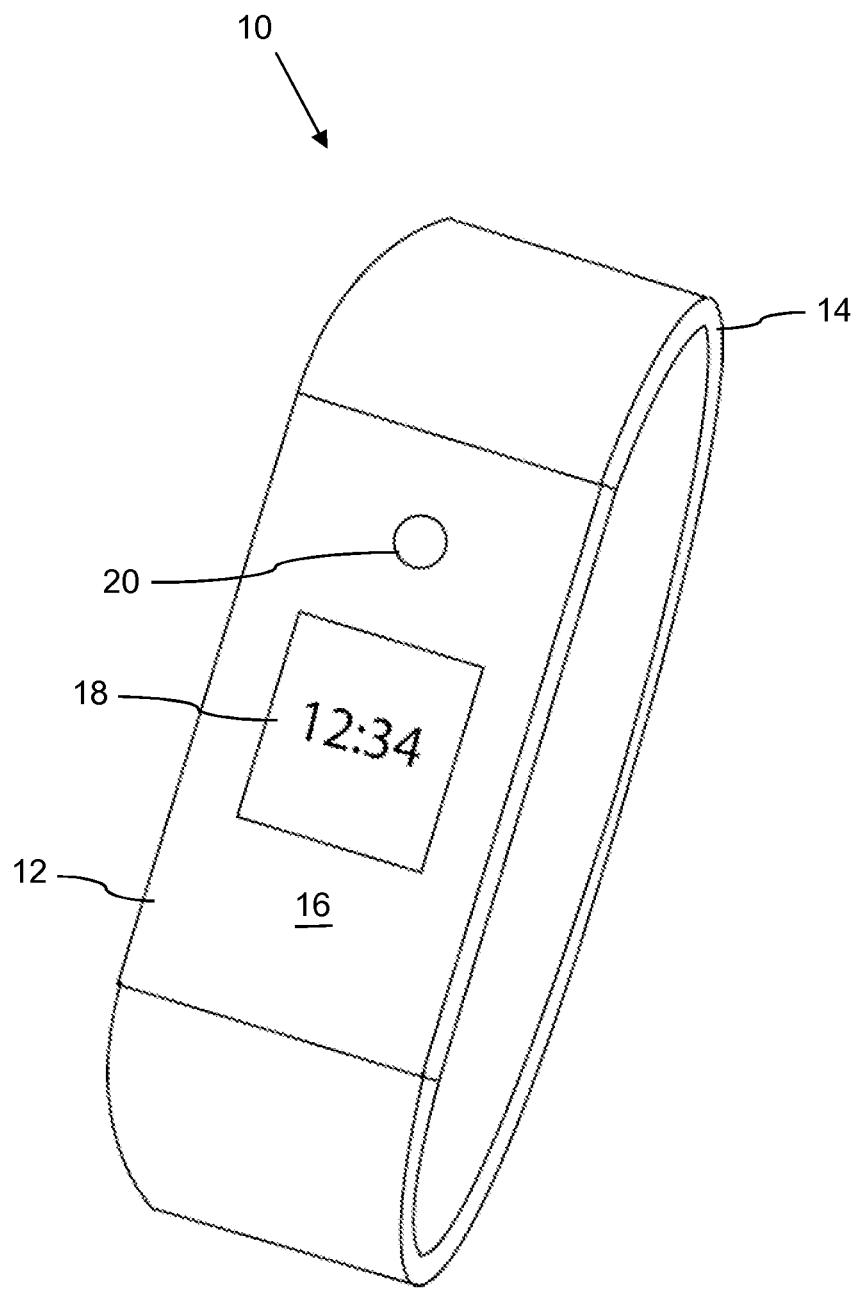
FIG. 1 is a perspective front view of a light sensing device as a part of a light sensing system as one embodiment of the present invention.

FIG. 1 shows a light sensing device 10 in the form of a wrist-worn device for sensing the ambient light intensity in the environment of a user (not shown) wearing this device 10. Generally the light sensing device 10 comprises an operation module 12 in the shape of a flat rectangular box, and a flexible wrist band 14 that is attached with its ends to opposite sides of the operation module 12 such that the operation module 12 and the wrist band 14 form a ring. The inner diameter of the wristband 14 is dimensioned such that the wrist-worn device 10 can comfortably be worn on the wrist of a user. For putting on the device 10, the wristband 14 may have a certain elasticity to be widened, or an opening and closing mechanism (not shown in the Figures) may be provided for connecting one end of the wristband 14 to the operation module 12. Generally the operation module 12 and the wristband 14 are formed similar to a common wristwatch.

The operation module 12 is formed as a housing that receives integrated electronic circuits for processing and storing electric signals and for performing the operation of sensing ambient light intensity. On the top surface 16 of the operation module 12, there is a display 18 for displaying a status information of the device 10 or any other information, like, for example, the daytime.

Further provided on the top surface 16 of the operation module 12 there is an ambient light sensor 20 for measuring the ambient light intensity. This ambient light sensor 20 is provided to measure the intensity of light within the visible light spectrum and to generate electric signals representing the measured light intensity within this spectrum. These signals can be interpreted as data concerning the present ambient light intensity.

In this embodiment, only one light sensor 20 is provided with one spectral range within the visible light. However, as will be further explained below, it is also possible to provide the light sensing device 10 with a plurality of light sensors 20 for different spectral ranges to be measured. The light sensor 20 provides an electric output intensity signal that corresponds to the measured light intensity. For example, this output intensity signal is proportional to the light intensity. The original light intensity signal is multiplied by a gain factor of this light sensor 20, which is a constant parameter, to result in the output intensity signal.

Figure 2:
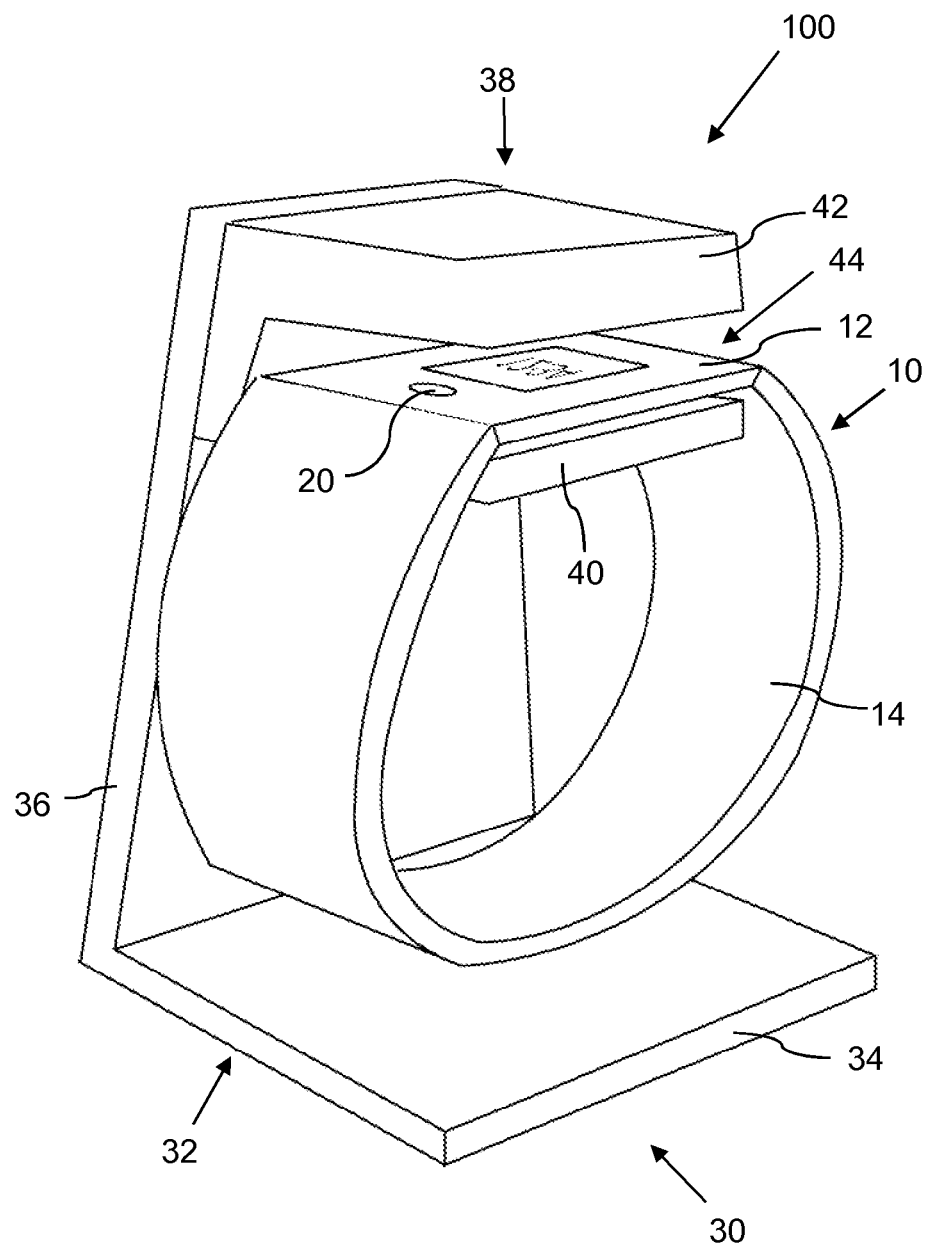
FIG. 2 shows a light sensing system according to the present invention, comprising the light sensing device as shown in FIG. 1.

To provide an accurate and reliable measurement result that represents the real intensity exposition, the light sensing device 10 shown in FIG. 1 is to be calibrated by a calibration device 30 shown in FIG. 2. The light sensing device 10 and the calibration device 30 represent different elements of a light sensing system 100. The calibration device 30 is formed as stand alone unit, which is a docking station 32 for supporting the light sensing device 10 in a non-use situation. The docking station 32 comprises a flat base plate 34, a flat column 36 rising vertically from one end of the base plate 34, and an upper support portion 38 for supporting the operation module 12 of the light sensing device. The support portion 38 comprises a lower flat portion 40 and an upper flat portion 42 that stand horizontal and parallel to each other with a gap 44 formed therebetween. This gap 44 is for receiving the operation module 12, as shown in FIG. 2. In the support situation the operation module 12 rests flat on the upper surface of the lower portion 40.

Within the upper portion 42, one light source (not shown in the Figs.) is arranged in a position that faces the light sensor 20 in the supported state of the light sensing device 10. By this arrangement the light sensor 20 can be illuminated directly by the light source. Upon this illumination, the light sensor 20 generates an output intensity signal corresponding to the measured light intensity.

The present light sensing system 100 is provided for performing a calibration operation to calibrate the light sensor 20. To perform this calibration, the light source is provided to emit light with a standard intensity which is defined by system parameters and environmental parameters. This standard intensity can also be controlled by a control means, like an electronic circuit, within the light sensing system 100. The control means can be provided, for example, within the calibration device 30. It is possible to provide a light source that it emits light of a polychromatic spectrum within a broad range.

The output intensity signal of the light sensor 20 is compared with an expected signal, which corresponds to the standard intensity, and the output intensity signal is matched to the expected signal. For example, if the output intensity signal of the light sensor 20 is lower than expected, the gain factor of this light sensor 20 is increased to meet the expected signal. For this calibration process, communication means can be provided within the light sensing system 100 for communicating between the calibration device 30 and the light sensing device 10. These communication means can be wireless communication means, or wire-bound communication means that operate when the light sensing device 10 and the calibration device 30 are in contact with each other.

The light sensing system 100, especially the calibration device 30 may also comprise a temperature sensor for sensing the temperature of the light source. This temperature sensor may provide an information that contributes to the accuracy of calibration, because the intensity of the light source may vary with temperature. For example, if the light source is a semiconductor light emitting device (LED), the output intensity may depend inversely on the temperature. This can be balanced by adapting the gain parameter of the light sensor 20 accordingly. In case there is more than one light sensor 20 provided, these light sensors can cover different spectral ranges, while they are illuminated with light of one single light source of a spectral range that covers all spectral ranges of the light sensors 20, i.e., from a polychromatic light source. For example, the light source is a white light source, while the light sensors 20 are colour specific sensors, like, for example, a red light sensor, a green light sensor and a blue light sensor. In this case the gain parameters of the light sensors 20 are adjusted based on the known energy level emitted in each respective colour band to match the expected signal accordingly.

In a common model, the resulting general output intensity signal can be described by the following formula.

$$\text{ILLUM(lx)} = 6.83*(\alpha*\text{red\_irradiance} + \beta*\text{green\_irradiance} + \chi*\text{blue\_irradiance}) \quad (1)$$

where red_irradiance, green_irradiance and blue_irradiance are the original intensity signals produced by the sensors in their respective colour bands, and $\alpha$, $\beta$, $\chi$ are the gain parameters of each respective red, green and blue colour channel. Different values for $\alpha$, $\beta$, $\chi$ correspond to the different contributions of the sensors in their respective colour band to the overall intensity. By adjusting the gain parameters $\alpha$, $\beta$, $\chi$, the different light sensors can be calibrated to adjust them to match their contribution to the general resulting output intensity signal ILLUM(lx). The new gain parameters can be stored in a memory of the light sensing system 100.

According to a different embodiment, there is also the possibility to provide a plurality of different light sources, namely one light source for each sensor with a spectral range that corresponds to the spectral range of its allocated sensor. In this case the calibration can be performed for each sensor separately, taking the standard intensity of each single light source as the calibration parameter. The gain parameter of each light sensor is adjusted to match its output intensity signal to the expected signal that corresponds to the standard intensity of the respective light source. For example, there are three light sensors, namely a red light sensor, a green light sensor and a blue light sensor, as described in the example above, while there are also three light sources, namely a red light source, a green light source and a blue light source. Each of these light sources is operated with a known standard intensity. The gain parameter of the red light sensor is adjusted so that the output intensity signal of this red light sensor matches the expected signal corresponding to the standard intensity of the red light source, and so on. By this operation mode it is possible to adjust the gain parameter of each light sensor to match the light energy emitted in each respective color band and to store the new gain values in the memory. Optionally, the spectrum of each light sensor can be adapted, for example, to a light temperature or to correspond to a specific light source (halogen, incandescent light, outdoor sunlight, etc.) within the expected intensity range.

The above described calibration methods can be performed by a computer software that it stored within a calibration device 30, that can be operated by the end user. The calibration process can be performed automatically each time the light sensing device 10 is placed within the calibration device 30, as shown in FIG. 2. The calibration device 30 may than automatically detect the presence of the light sensing device 10 within the support portion 38, and start the calibration process, i.e. starting to perform a respective computer program. In this arrangement the calibration process can be performed each time the light sensing device 10 is not in use, between two subsequent measuring epochs. Consequently the light sensing device 10 is calibrated each time a new measurement epoch is started. This is a large advantage over known light sensing devices 10 which are calibrated once by the manufacturer and do not provide a possibility for the user to calibrate the light sensing device 10 afterwards, to keep the reliability of the measurement results.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. Light sensing system comprising:
    a light sensing device configured to be worn by a user, the light sensing device comprising a plurality of light sensors configured to sense ambient light intensity from different directions within different spectral ranges;
    a calibration device for calibrating the plurality of light sensors, wherein the calibration device comprises one or more light sources configured to emit light from a known direction with respect to the light sensing device, and wherein the calibration device is a docking station for supporting the light sensing device when the light sensing device is not being worn by the user, the docking station comprising:
        a base,
        a column extending from the base, and
        a support portion coupled to the column at an end of the column opposite the base, the support portion comprising:
            the one or more light sources configured to emit light from the known direction with respect to the light sensing device, and
            a surface configured to support the light sensing device in proximity to the one or more light sources; and
        a controller configured to control the one or more light sources such that the one or more light sources emit light with a known standard intensity and a known spectral range that impacts a circadian rhythm of the user.

2. Light sensing system according to claim 1, wherein the controller is configured to compare an output intensity signal of the plurality of light sensors corresponding to a measured light intensity with an expected signal corresponding to the standard intensity, known spectral range, and known direction with respect to the light sensing device, and for matching the output intensity signal to the expected signal by adjusting a gain parameter of the output intensity signal, the standard intensity corresponding to ambient light intensity when the light sensing device is worn by the user.

3. Light sensing system according to claim 2, wherein the controller is included within the calibration device and comprises wireless communication means for communicating between the calibration device and the light sensing device.

4. Light sensing system according to claim 2, comprising a temperature sensor for sensing the temperature of the light sources, wherein the controller is configured such that adjusting the gain parameter of the output intensity signal is further based on the temperature of the light sources.

5. Light sensing system according to claim 1, wherein the calibration device comprises one light source emitting light within a spectral range covering all spectral ranges of the light sensors.

6. Light sensing system according to claim 1, wherein the calibration device comprises a plurality of light sources emitting light within different spectral ranges corresponding to the spectral ranges of the light sensors.

7. Light sensing system according to claim 1, wherein the spectral ranges of the light sources are adjustable.

8. Light sensing system according to claim 1, wherein the light sensing device further comprises:
    a housing configured to house the plurality of light sensors; and
    a band coupled to the housing configured to removably engage a part of a body of the user.

9. Light sensing system according to claim 8, wherein the band is flexible and configured to removably engage a wrist of the user.

10. Method for calibrating a light sensing device of a light sensing system, wherein the light sensing device is configured to be worn by a user and comprises a plurality of light sensors, the light sensing system further comprising a calibration device comprising one or more light sources, and a controller; the method comprising:
- controlling, with the controller, the one or more light sources such that the one or more light sources emit light with a known standard intensity and a known spectral range that impacts a circadian rhythm of the user, the standard intensity corresponding to ambient light intensity when the light sensing device is worn by the user;
- supporting, with a docking station, the light sensing device, the docking station comprising:
  - a base,
  - a column extending from the base, and
  - a support portion coupled to the column at an end of the column opposite the base, the support portion comprising:
    - the one or more light sources, and
    - a surface configured to support the light sensing device in proximity to the one or more light sources,
- illuminating, with light from the one or more light sources of the calibration device, the plurality of light sensors of the light sensing device while the light sensing device is not worn by the user, said light from the one or more light sources having a known direction with respect to the light sensing device, the plurality of light sensors generating an output intensity signal,
- comparing, with the controller, the output intensity signal with an expected signal corresponding to the standard intensity, known spectral range, and known direction with respect to the light sensing device; and
- matching, with the controller, the output intensity signal to the expected signal by adjusting a gain parameter of the output intensity signal.

11. Method according to claim 10, wherein the plurality of light sensors of different spectral ranges are illuminated with light of one single light source with the standard intensity, known spectral range, and known direction with respect to the light sensing device, and gain parameters $\alpha$, $\beta$, $\chi$ of the output intensity signal of the plurality of light sensors are adjusted to match their contribution to the output intensity signal.

12. Method according to claim 10, wherein the plurality of light sensors of different spectral ranges are illuminated with light of different light sources each having a spectral range corresponding to the spectral range of a first light sensor of the plurality of light sensors and having a standard intensity, a known spectral range, and a known direction with respect to the light sensing device, the output intensity signal of the first light sensor is compared with an expected signal corresponding to the standard intensity, the known spectral range, and the known direction with respect to the light sensing device of its corresponding light source, and the gain parameter $\alpha$, $\beta$, $\chi$ of the first light sensor is adjusted to match the output intensity signal of the first light sensor to the expected signal.

13. Method according to claim 10, comprising the step of adjusting the spectral range or ranges of the light sources.

14. Method according to claim 10, comprising the step of sensing the temperature of the light sources and adjusting the gain parameters according to the sensed temperature.

15. Method according to claim 10, wherein the method is performed by a computer program, on one or more computer processors configured with machine read-able instructions.

16. Method according to claim 10, further comprising:
- housing the plurality of light sensors in a housing of the light sensing device; and
- removably engaging a part of a body of the user with a band of the light sensing device.

17. Method according to claim 16, wherein the band is flexible, and wherein the method further comprises removably engaging a wrist of the user with the band.

* * * * *